United States Patent [19]
Choi

[11] Patent Number: 5,979,915
[45] Date of Patent: Nov. 9, 1999

[54] CARGO BALANCING SYSTEM FOR A CARGO TRUCK

[75] Inventor: Sugjung Choi, Ulsan-si, Rep. of Korea

[73] Assignee: Hyundai Motor Company, Jongro-ku, Rep. of Korea

[21] Appl. No.: 08/987,999

[22] Filed: Dec. 10, 1997

[30] Foreign Application Priority Data

Dec. 10, 1996 [KR] Rep. of Korea ........................ 96-63400

[51] Int. Cl.⁶ .................................................... B60S 9/00
[52] U.S. Cl. ......................................... 280/6.154; 298/175
[58] Field of Search ............................ 280/61.54, 61.59, 280/6.16; 180/282; 296/40; 298/175

[56] References Cited

U.S. PATENT DOCUMENTS

1,085,608  2/1914  Heath ..................................... 123/146.5
5,769,502  6/1998  Bettini ..................................... 298/175

*Primary Examiner*—Christopher P. Ellis
*Assistant Examiner*—Kevin McKinley
*Attorney, Agent, or Firm*—Christie, Parker & Hale, LLP

[57] ABSTRACT

Disclosed is a cargo balancing system for a cargo truck having front, rear, right, and rear sides. The cargo balancing system includes a horizontal sensor for sensing whether the cargo truck is driving on a flat surface or on a slant to the right or left of the cargo truck, and inputting corresponding signals to a controller; and side panel swing means for controlling a side panel of the cargo truck according to electric power applied from the controller in response to the signals, the side panel being pivotally mounted to a truck bed of the cargo truck.

20 Claims, 10 Drawing Sheets

CARGO BALANCING SYSTEM FOR A CARGO TRUCK

FIELD OF THE INVENTION

The present invention relates to a cargo balancing system for cargo trucks, and more particularly, to a cargo balancing system for a cargo truck which, when driving on an extreme slanted road or making sharp turns, prevents tilting of goods in a bed of the truck and maintains the same in a horizontal state to circumvent the possible overturning of the truck.

BACKGROUND OF THE INVENTION

When freight is loaded high in an open-bed cargo truck, the goods often tilt when driving on a slanted road or when making sharp turns. Namely, as the truck slants together with the slant of the road, the weight of the goods loaded in the bed of the truck forces the goods to tilt in the direction of the slant. Centrifugal forces when making sharp turns, especially at high speeds, often causes the same problem. Accordingly, the driver must stop the truck and re-fasten the goods in the bed of the truck in an upright state.

Further, a mix of the right factors—extreme slant in the road, overly top-heavy load, both a slant in the road and a turn in the opposite direction of the slant, high speed turning, etc.—can cause the truck carrying a large load to overturn.

SUMMARY OF THE INVENTION

The present invention has been made in an effort to solve the above problems.

It is an object of the present invention to provide a cargo balancing system for a cargo truck which maintains cargo in the bed of a truck in upright and horizontal states when turning or driving on a slanted road.

To achieve the above object, the present invention provides a cargo balancing system for a cargo truck having front, rear, right, and left sides. The cargo balancing system includes horizontal sensing means for sensing whether the cargo truck is driving on a flat surface or on a slant to the right or left of the cargo is truck, and inputting corresponding signals to a controller; a side panel tilting system side panel swing means for controlling a aide panel of the cargo truck according to electric power applied from the controller in response to the signals, the side panel being pivotally mounted to a truck bed of the cargo truck; and a side panel extender or elevating means for elevating an extension or elevating member above the side panel of the cargo truck according to electric power applied from the controller.

The horizontal sensing means includes a main body; a guide groove formed at a predetermined length in a longitudinal direction in the main body and curving upward in both directions from a center point thereof; a roll ball positioned in the guide groove and able to move freely therein; and center, left, and right contact sensors disposed in the guide groove, the contact sensors being activated by contact with the roll ball.

The side panel tilting system or side panel swing means comprises a plurality of tilt or swing actuators mounted at predetermined intervals to the side panel and to an upper surface of the truck bed.

Each actuator comprises a cylinder having a predetermined inner diameter, the cylinder being hingedly mounted to the upper surface of the truck bed; upper and lower field coils provided in the cylinder; a plunger provided between the upper and lower field coils; a rod integrally formed to an upper end of the plunger, the rod extending out of the cylinder to be is hingedly connected to the side panel; an upper elastic member interposed between an upper surface of the plunger and an upper inside wall of the cylinder; and a lower elastic member interposed between a lower surface of the plunger and a lower inside wall of the cylinder.

The elevating members comprise a bar having free ends, an upper portion formed protruding upward in a center, upper end of the bar, and catch ridges formed between the free ends and the upper portion.

The elevating means comprises a plurality of actuators mounted on the side panels of the cargo truck and connected to the elevating members to ascend the same according to electric signals from the controller.

The actuators comprise a cylinder disposed surrounding a free end of the elevating means, a plunger connected to the free end, a field coil disposed in an upper end of the cylinder, and an elastic member interposed between a top surface of the plunger and an inside upper wall of the cylinder.

A pair of locking actuators are provided on each elevating member, the locking actuators maintaining the elevating members in a descended state.

The locking actuators comprise a cylinder, a field coil disposed in the cylinder at the furthermost extreme from a bar of the elevating member, a plunger mounted in the cylinder and able to elide along a longitudinal direction of the cylinder, an elastic member interposed between an inside wall of the cylinder and the plunger, and a locking arm integrally mounted to the plunger and protruding out of the cylinder to contact a catch ridge of the elevating member when the locking actuator is in an elongated state.

BRIEF DESCRIPTION OF THE DRAWINGS

Further objects and other advantages of the present invention will become apparent from the following description in conjunction with the attached drawings, in which:

FIG. 10 is a front view of the cargo truck shown in FIG. 3 where.

DETAILED DESCRIPTION OF THE PREFERRED EMBODIMENTS

A preferred embodiment of the present invention will now be described in detail with reference to the accompanying drawings.

Certain terminology will be used in the following description for convenience and reference only and will not be limiting. The words "right", "left", "upper", and "lower" will designate directions in the drawings to which reference is made.

Figure 1:
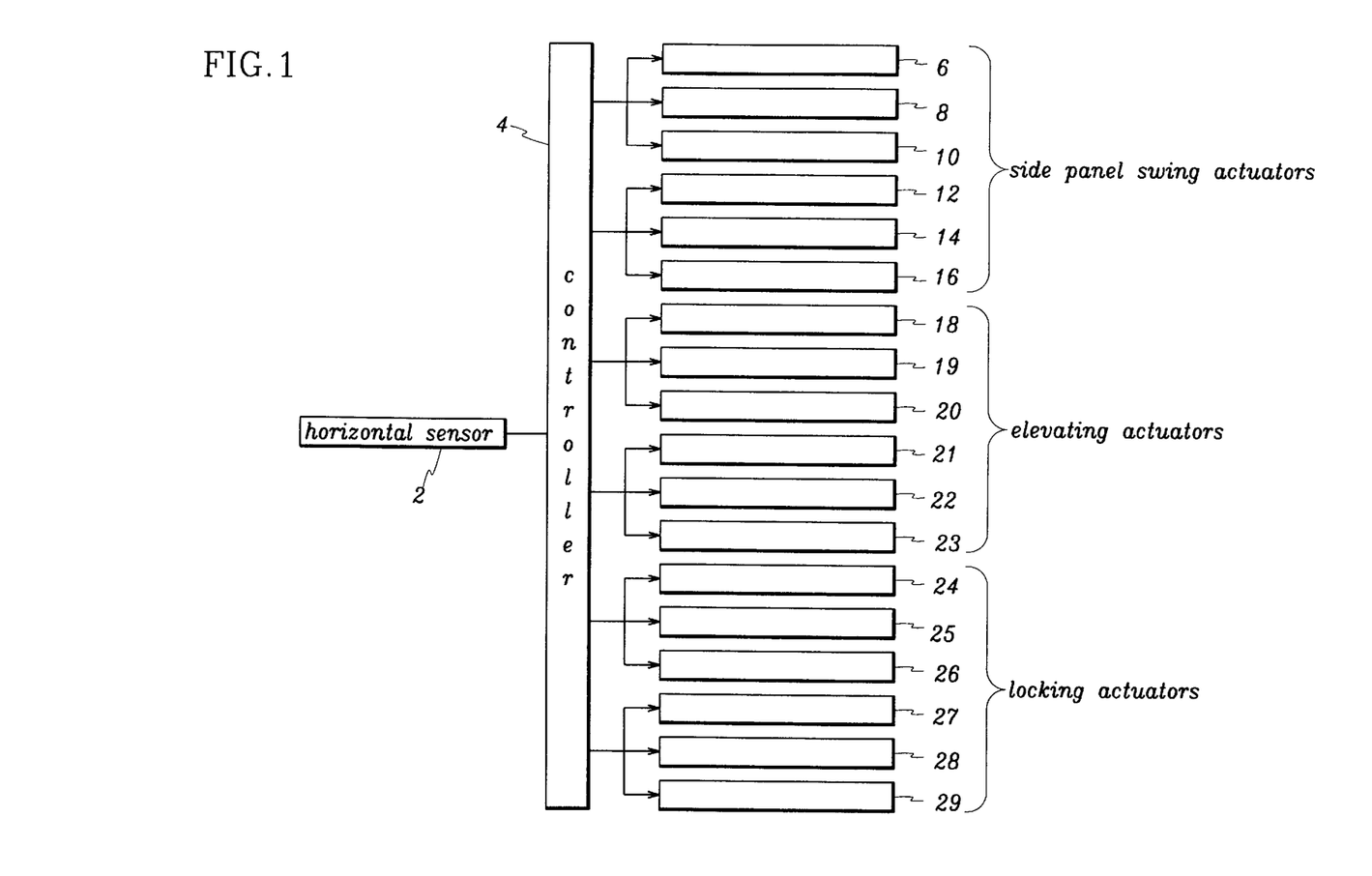
FIG. 1 is a block diagram of a cargo balancing system according to a preferred embodiment of the present invention.

Referring first to the block diagram of FIG. 1, the inventive cargo balancing system comprises a horizontal sensor 2; a controller 4; a plurality of side panel swing or tilt actuators, arranged in two groups of three, 6, 8, and 10, and 12, 14, and 16; a plurality of elevating actuators, also arranged in two groups of three, 18, 19, and 20, and 21, 22, and 23; and a plurality of locking actuators, also arranged in two groups of three, 24, 25, and 26, and 27, 28, and 29.

The horizontal sensor 2 detects whether a cargo truck is in a level or extreme slanted state. The positioning of the horizontal sensor 2 on the vehicle should be such that these detections can be accurately made, i.e., in a central position along a width of the vehicle.

Figure 2:
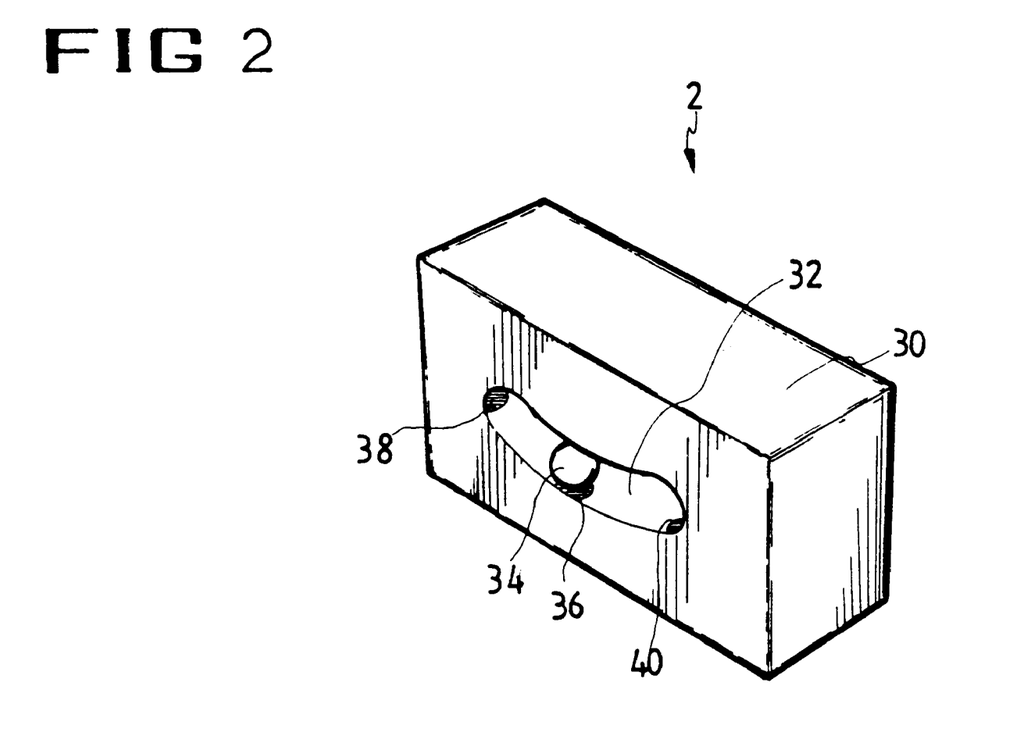
FIG. 2 is a perspective view of a horizontal detecting sensor according to a preferred embodiment of the present invention.

As shown in FIG. 2, the horizontal sensor 2 of the present invention comprises a main body 30, a guide groove 32 formed at a predetermined length in a longitudinal direction in the main body 30 and curving upward in both directions from a center point thereof, and a roll ball 34 positioned in the guide groove 32 and able to move freely therein. Further, center, left, and right contact sensors 36, 38, and 40 are disposed in the guide groove 32, the contact sensors 36, 38, and 40 being activated by contact with the roll ball 34.

Accordingly, with the placement of the horizontal sensor 2 at a central position along the width of the cargo truck, when the truck is driving on a substantially flat surface, having no gradient in a direction along the width of the vehicle, the roll ball 34 is positioned in the guide groove 32 contacting the center contact sensor 36. However, when the vehicle encounters a road surface with an extreme slant, the ball 36 comes to be positioned in the guide groove 32 contacting either the left or right contact sensor 38 and 40, according to the direction of the slant in the road.

In either of the three cases above, a corresponding signal is sent to the controller 4 by the activation of the contact sensors 36, 38, and 40. From the signals input from the horizontal sensor 2, the controller 4 determines which, if any, of the actuators 6–29 need to be operated.

Figure 3:
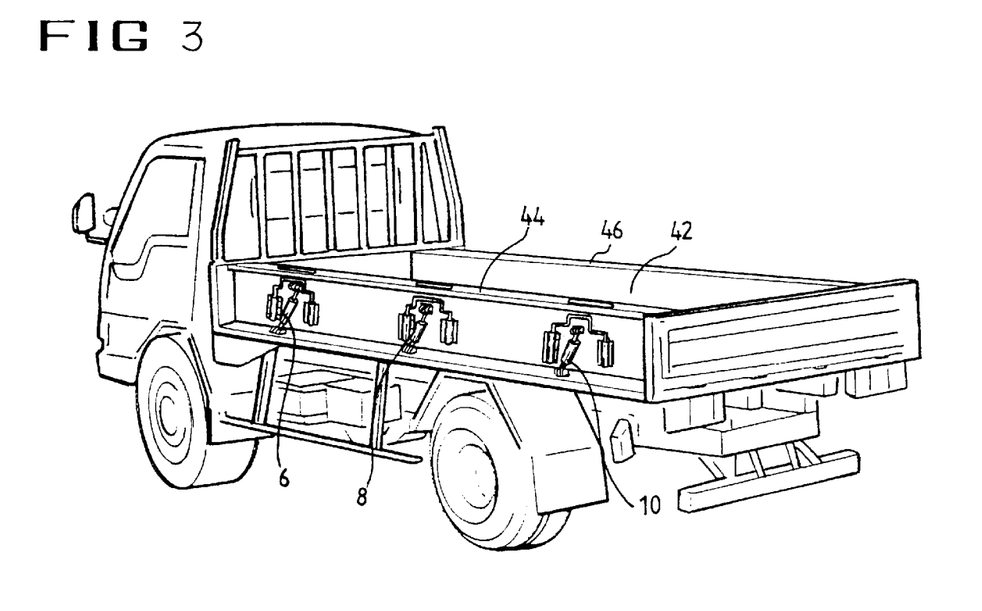
FIG. 3 is a perspective view of a cargo truck used to illustrate positioning of actuators according to a preferred embodiment of the present invention.
Figure 4:
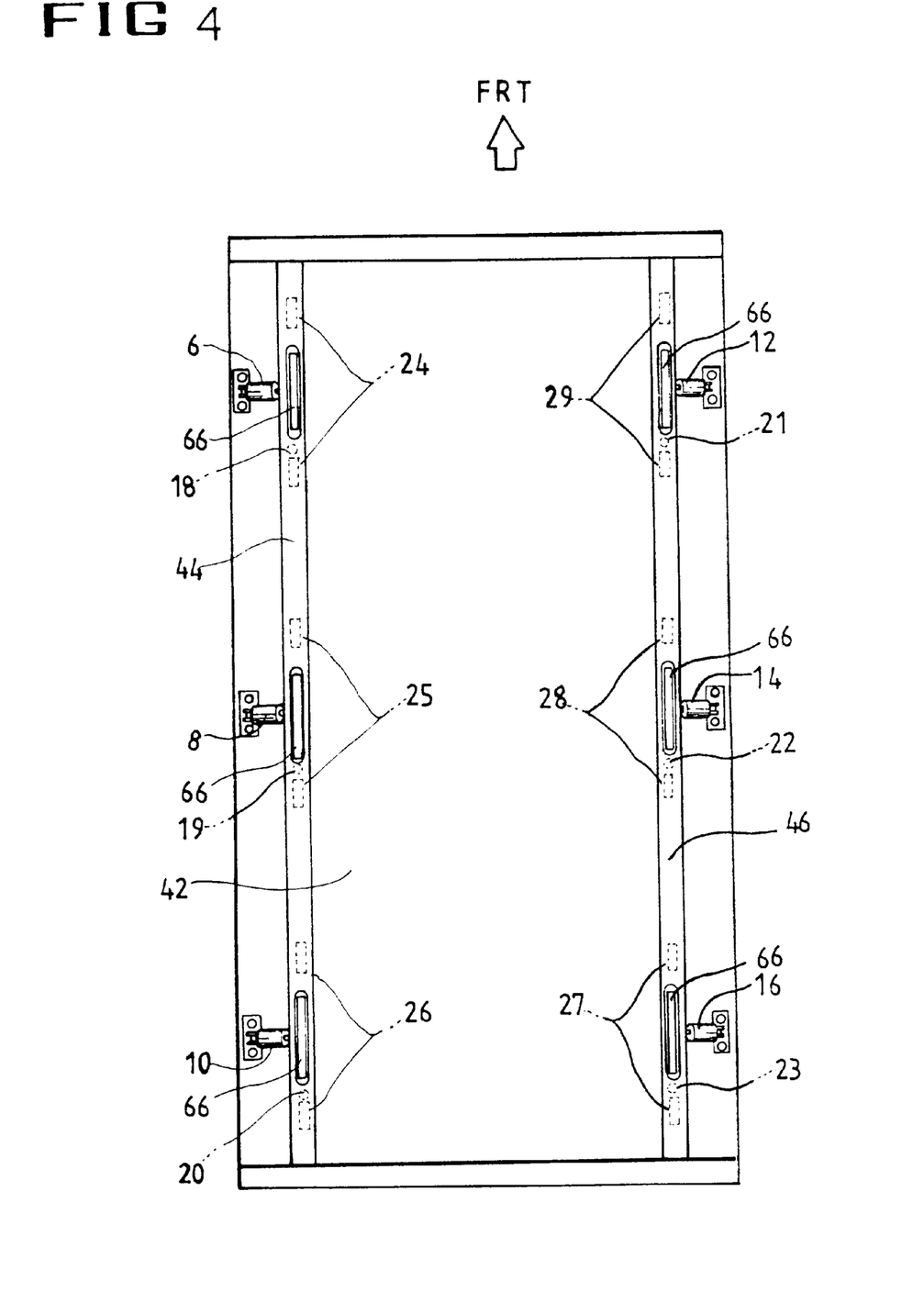
FIG. 4 is a plan view illustrating a cargo bed of the cargo truck shown in FIG. 3.

As shown in FIGS. 3 and 4, the side panel swing actuators 6, 8, 10 are mounted at predetermined intervals to a left side panel 44 of a truck bed 42, while the side panel swing actuators 12, 14, and 16 are mounted at predetermined intervals to a right side panel 46 of the truck bed 42 (only FIG. 4). The left and right side panels 44 and 46 are pivotally mounted to an upper surface of the truck bed 42.

Figure 5:
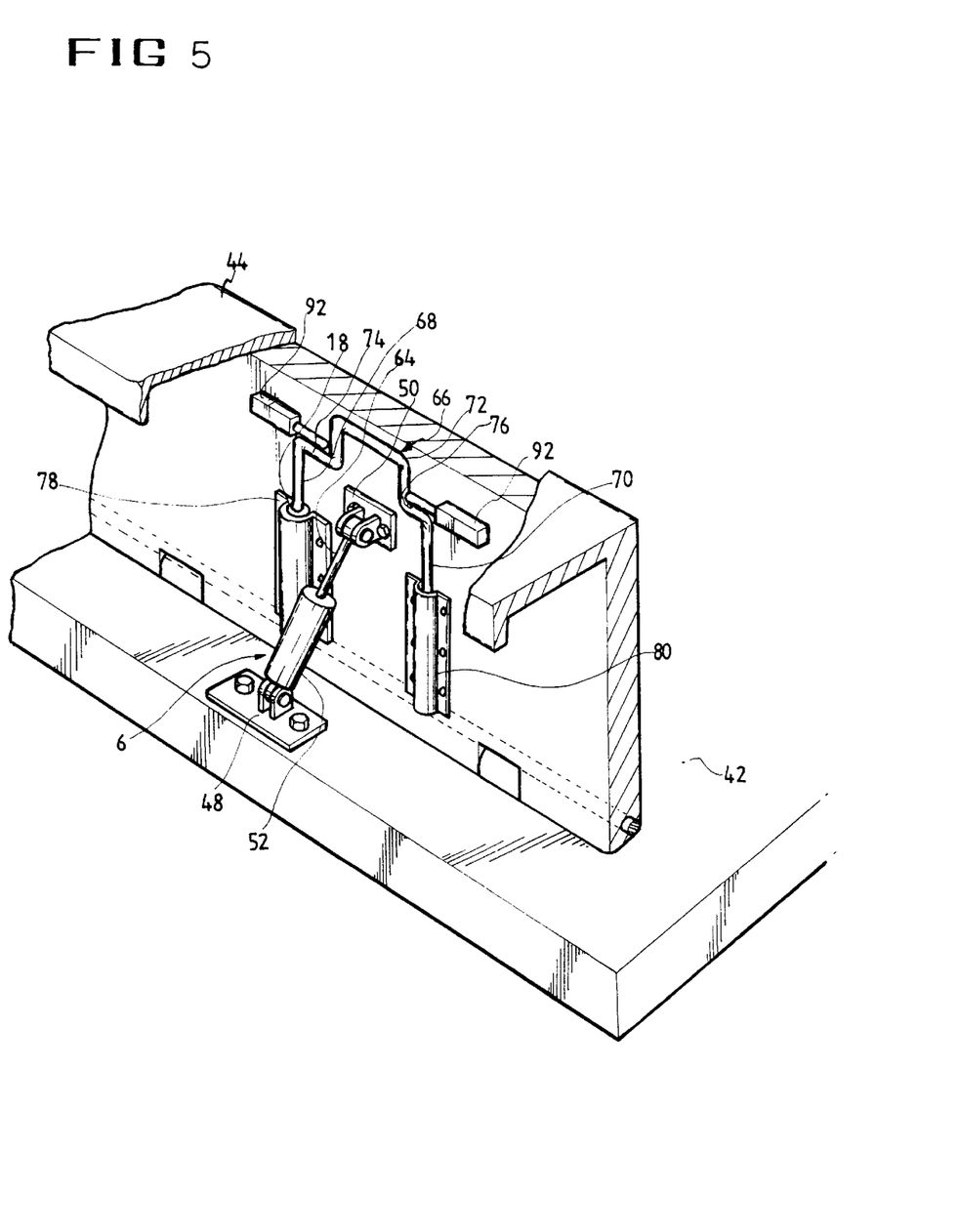
FIG. 5 is an enlarged perspective view of essential parts of the present invention.

Referring now to FIG. 5, the structure of the side panel swing actuators 6, 8, 10, 12, 14, and 16 will be described in more detail with reference to one side panel swing actuator 6. It is to be assumed that each side panel swing actuator 6, 8, 10, 12, 14, and 16 is identical in structure, with attachment positions realized as shown in FIG. 4, and operation to that of the side panel swing actuator 6 being described in detail.

As shown in the drawing, the side panel swing actuator 6 comprises a lower bracket 48 fixedly mounted to the upper surface of the truck bed 42, an upper bracket 50 fixedly mounted to an outside surface of the left side panel 44, a cylinder 52 hingedly fixed to the lower bracket 48, and a rod 64 hingedly fixed to the upper bracket 50.

Figure 6:
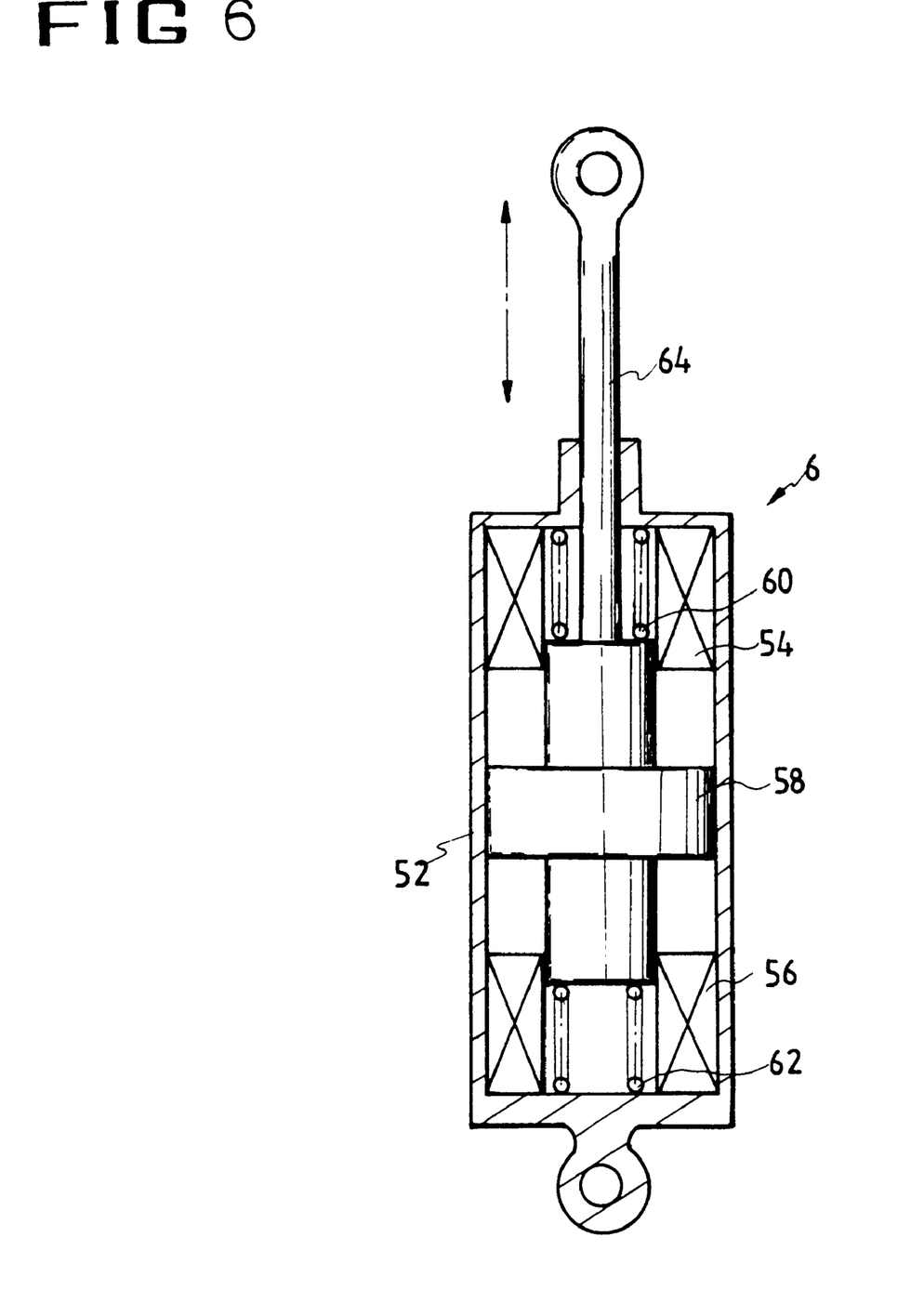
FIG. 6 is a sectional view of an actuator shown in FIG. 3.

As shown in FIG. 6, illustrating a sectional view of the side panel swing actuator 6, upper and lower field coils 54 and 56 are provided in the cylinder 52, and a plunger 58 is provided between the upper and lower field coils 54 and 56, upper and lower ends of the plunger 58 contacting the upper and lower field coils 54 and 56, respectively. The rod 64 is integrally formed to the upper end of the plunger 58, the rod 64 and the plunger 58 having identical longitudinal axes. The rod 64 extends out of the cylinder 52 to be connected with the upper bracket 50. In addition, an upper elastic member 60 is interposed between an upper end surface of the plunger 58 and an upper inside wall of the cylinder 52, and a lower elastic member 62 is interposed between a lower end surface of the plunger 56 and a lower inside wall of the cylinder 52.

In the side panel swing actuator 6 structured as in the above, when electricity is applied to the lower field coil 56 the plunger 58 descends in the cylinder 52, while when electricity is applied to the upper field coil 54 the plunger 58 ascends in the cylinder 52.

Figure 7:
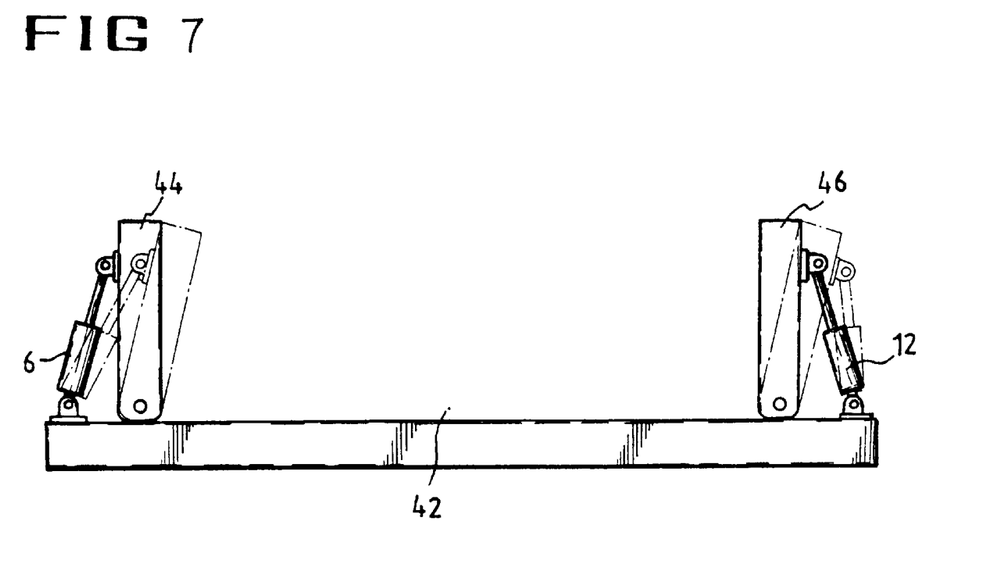
FIG. 7 is a rear schematic view illustrating the operation of the side panel swing actuators shown in FIG. 6.

Accordingly, the left and right side panels 44 and 46 can be controlled to swing to the left and right by the two groups of actuators 6, 8, and 10, and 12, 14, and 16 operating in opposite directions. Namely, when the actuators 6, 8, and 10 mounted to the left side panel 44 are controlled to elongate, the actuators 12, 14, and 16 are controlled to contract. As a result, the left and right side panels 44 and 46 lean to the right as shown by the phantom lines in FIG. 7. When the two groups of actuators 6, 8, and 10, and 12, 14, and 16 are controlled to activate in the opposite of the above, the left and right side panels 44 and 46 lean to the left.

Referring back to FIG. 4, side panel extension or elevating members 66 are provided on both the left and right side panels 44 and 46 at locations corresponding to each of the side panel swing actuators 6, 8, 10, 12, 14, and 16.

Referring to FIG. 6, the side panel elevating members 66 comprise a bar 67 having free ends 68 and 70; an upper portion 72 formed protruding upward in a center, upper end of the bar 67: and catch ridges 74 and 76 formed between the free ends 68 and 70 and the upper portion 72.

Referring back to FIG. 5, the side panel elevating members 66 further comprise guides 78 and 80 fixedly attached to the left and right side panels 44 and 46 (although the drawing illustrates only one side panel elevating member 66, it is to be assumed that the same structure explained herein applies to each of the side panel elevating members 66 on both the left and right side panels 44 and 46). The free ends 68 and 70 of the bar 67 are slidably disposed respectively in the guides 78 and 80 such that the bar 67 is able to ascend and descend.

Describing in more detail, side panel elevating actuators 18–23 are provided corresponding to the free end 68 of each bar 67 of the side panel elevating member 66. To simplify the explanation, one side panel elevating actuator 18 will be described with reference to FIG. 8.

Figure 8:
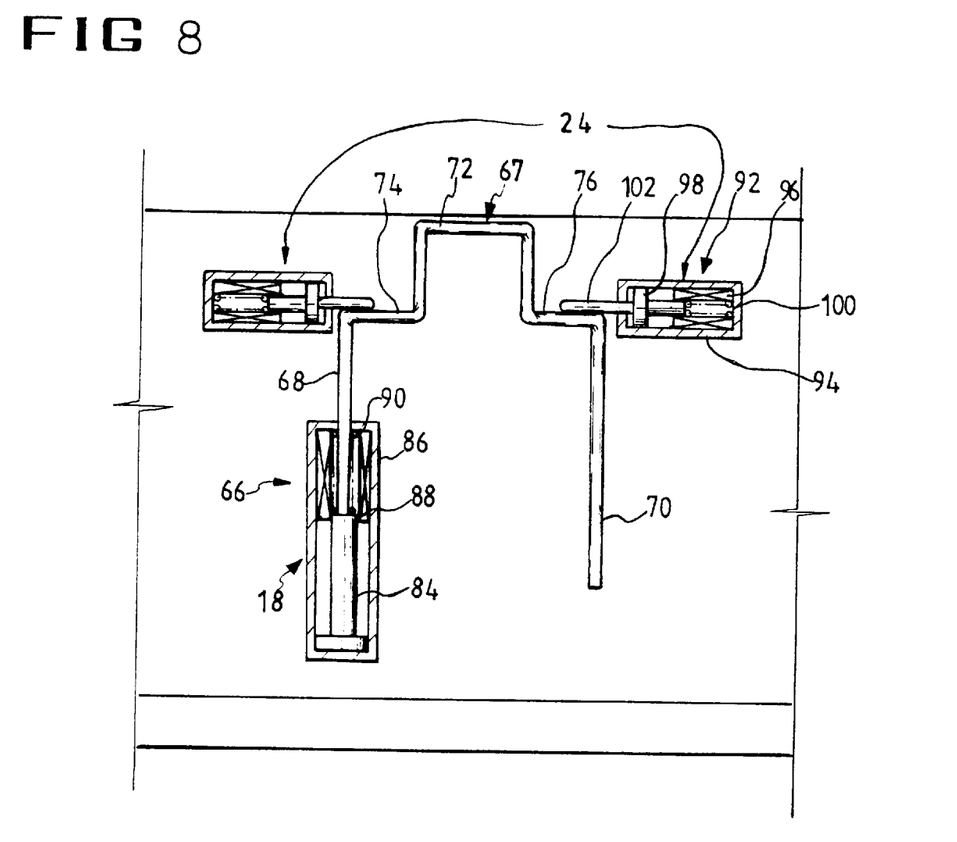
FIG. 8 is a partial cross-sectional view of an elevating mechanism according to a preferred embodiment of the present invention.

The side panel elevating actuator 18 comprises a cylinder 86 disposed surrounding the free end 68 and encased by the guide 78, a plunger 84 integrally connected to the free end 68, a field coil 88 disposed in an upper end of the cylinder 86, and an elastic member 90 interposed between a top surface of the plunger 84 and an inside, upper wall of the cylinder 86.

In the present invention, although the side panel actuator 18 is provided at only one of the free ends 68, the present invention is not limited to this configuration and it possible to provide the actuator 18 at both of the free ends 68 and 70.

Further, pairs of locking actuators 24–29 are provided on the catch ridges 74 and 76 of each of the bars 67. Here also, for ease of explanation, the locking actuator 24 provided corresponding to only the catch ridge 76 of the bar 67 in FIG. 8 will be described.

In the drawing, the locking actuator 24 comprises a cylinder 94, a field coil 96 disposed in the cylinder 94 at the furthermost extreme from the bar 67, a plunger 98 mounted in the cylinder 94 and able to slide left and right therein, an elastic member 100 interposed between a right inside wall of the cylinder 94 and the plunger 98, and a locking arm 102 integrally mounted to the plunger 98 and protruding out of the cylinder 94 to contact the catch ridge 76 when the locking actuator 24 is in an elongated state.

Figure 9:
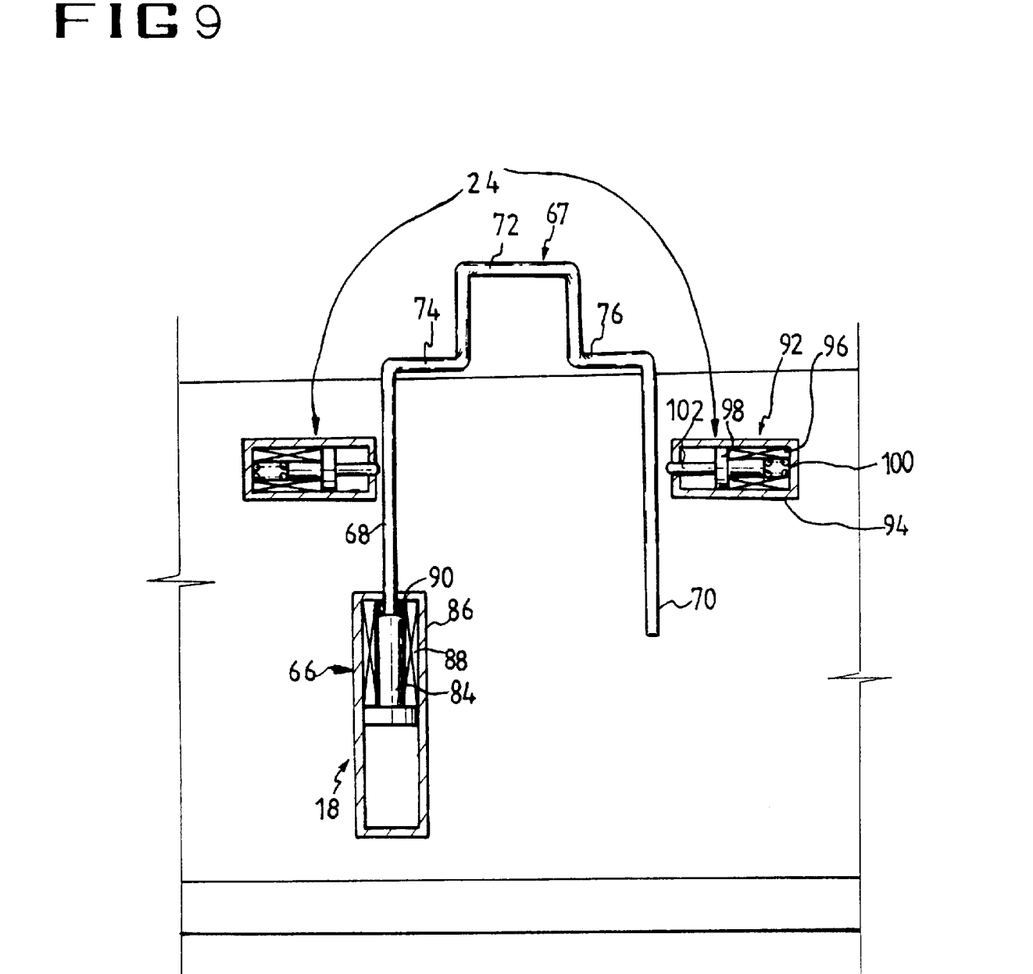
FIG. 9 is a partial cross-sectional view illustrating the operation of the elevating mechanism shown in FIG. 8.

In a state where the locking actuator 24 is not activated, the locking arm 102 is maintained contacting the catch ridge 76 by the elastic force of the elastic member 100. However, when electric power is applied to the field coil 96, the plunger 98 moves to the right by the magnetic force generated by the field coil 96, overcoming the elastic force of the elastic member 100. As a result, the locking arm 102 of the locking actuator 24 is released from the catch ridge 76 as shown in FIG. 9.

From the above state, the side panel elevating member 66 is free to operate. Namely, by applying electric power to the field coil 88 of the side panel elevating member 66, the plunger 84 ascends from the magnetic force generated, overcoming the elastic force of the elastic member 90, and the bar 67 of the side panel elevating member 66 ascends as shown in FIG. 9. When the supply of electric power to the field coil 88 is discontinued, the plunger 64 is maintained in a downward position by the elastic force of the elastic member 90.

In the present invention structured as in the above, when the cargo truck is driving on a slanted road, if the inclination from the horizontal is extreme, the roll ball 34 of the horizontal sensor 2 repositions itself in the guide groove 32 to contact either the left or right contact sensor 38 and 40, depending on the direction of the slant. Accordingly, an electric signal is sent to the controller 4.

Figure 10A:
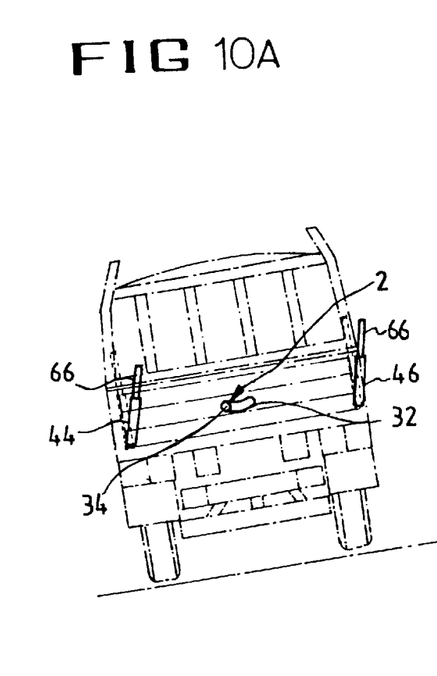
FIG. 10A shows the truck on a right slant.

As a result, the controller 4 operates the two groups of side panel swing actuators 6, 8, and 10, and 12, 14, and 16 to activate in opposite directions to compensate for the slant in the road. Namely, as shown in FIG. 10A, when the slant in the road is to the left, the side panel swing actuators 6, 8, and 10 connected to the left side panel 44 are controlled by the controller 4 to elongate, and the side panel swing actuators 12, 14, and 16 connected to the right side panel 46 to contract such that the left and right side panels 44 and 46 of the cargo truck swing to the right to compensate for the slant in the road.

Figure 10B:
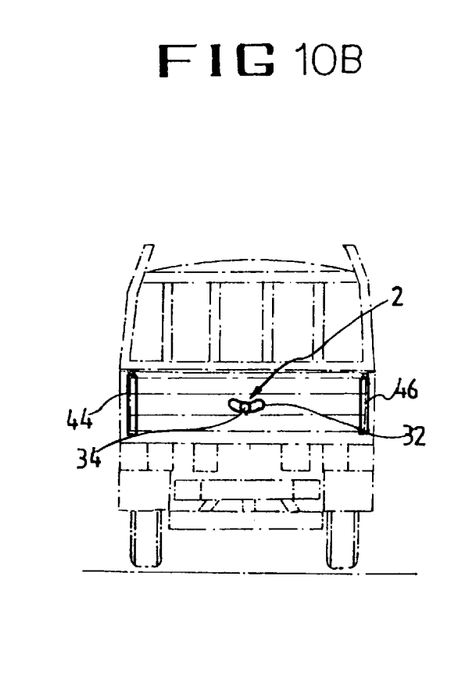
FIG. 10B shows the truck on a flat surface.
Figure 10C:
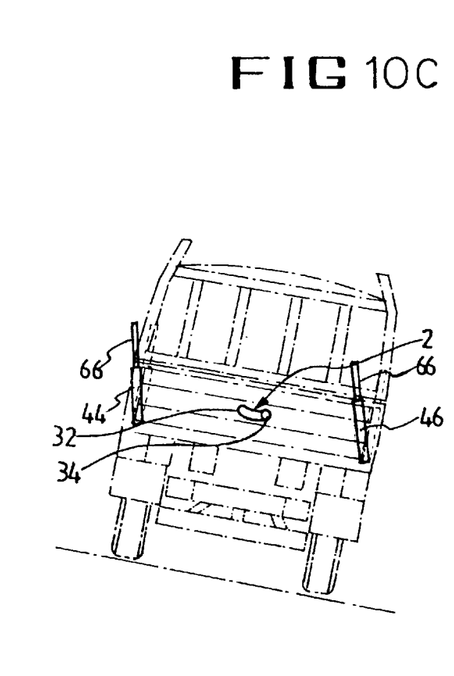
FIG. 10C shows the truck on a left slant.

However, when the slant in the road is to the right, as shown in FIG. 10C, the controller 4 operates the side panel swing actuators 6, 8, 10, 12, 14, and 16 to activate in the opposite manner as in the above such that the left and right aide panels 44 and 46 swing to the left.

Further, when the vehicle returns to a level driving state, as shown in FIG. 10B, the roll ball 34 of the horizontal sensor 2 returns to contact the center contact sensor 36. Accordingly, the controller 4 discontinues the supply of electric power to the side panel swing actuators 6, 8, 10, 12, 14, and 16 such that the plungers 58 therein return to a central position by the upper and lower elastic members 60 and 62. As a result, the left and right side panels 44 and 46 of the cargo truck return to an upright position, to a position substantially perpendicular to the truck bed 42.

Simultaneously with the above, when the roll ball 34 of the horizontal sensor 2 contacts either the left or right contact sensors 38 and 40, the locking arms 102 of the locking actuators 24–29 are controlled by the controller 4 to be released from the catch ridges 74 and 76 of the side panel elevating members 66. Also, the bare 67 of the side panel elevating members 66 are controlled to ascend as shows in FIGS. 10A and 10C.

However, when driving on a substantially level road surface, the roll ball 34 of the horizontal sensor 2 contacts the center contact sensor 36 such that the locking actuators 24–29 remain engaged with the catch ridges 74 and 76 of the side panel elevating members 66, and the bars 67 of the side panel elevating members 66 remain in downward states as shown in FIG. 10B.

In the present invention structured and operating as in the above, as the side panels of the cargo truck compensate for extreme slants in the road and sharp turns in the road, the goods loaded in the cargo bed of the truck are prevented from shifting and tilting overly to one direction, thereby preventing overturning of the truck.

Although a preferred embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A cargo balancing system for a cargo truck having front, rear, right, and left sides, comprising:

a controller;

a side panel pivotally mounted to a bed of the cargo truck;

horizontal sensing means for sensing whether the cargo truck is driving on a flat surface or on a slant to the right or left of the cargo truck, and inputting corresponding signals to the controller;

side panel swing means for controlling the side panel of the cargo truck according to electric power applied from the controller in response to the signals.

2. The cargo balancing system according to claim 1, wherein the horizontal sensing means comprises:

a main body;

a guide groove formed at a predetermined length in a longitudinal direction in the main body and curving upward in both directions from a center point thereof;

a roll ball positioned in the guide groove and able to move freely therein; and center, left, and right contact sensors disposed in the guide groove, the contact sensors being activated by contact with the roll ball.

3. The cargo balancing system according to claim 1, wherein the side panel swing means comprises a plurality of swing actuators mounted at predetermined intervals to the side panel and to an upper surface of the truck bed.

4. The cargo balancing system according to claim 3, wherein each of the swing actuators comprises:

a cylinder having a predetermined inner diameter, the cylinder being hingedly mounted to the upper surface of the truck bed;

upper and lower field coils provided in the cylinder;

a plunger provided between the upper and lower field coils;

a rod integrally formed to an upper end of the plunger, the rod extending out of the cylinder to be hingedly connected to the side panel;

an upper elastic member interposed between an upper surface of the plunger and an upper inside wall of the cylinder; and a lower elastic member interposed between a lower surface of the plunger and a lower inside wall of the cylinder.

5. A cargo balancing system for a cargo vehicle having a cargo, the system comprising:

a pair of side panels pivotally mounted to the cargo bed;

a horizontal sensor for providing a signal indicative of a tilt of the vehicle;

a controller operatively coupled to the horizontal sensor for receiving the signal from the horizontal sensor;

a side panel tilting system operatively coupled to the controller, wherein the side panel tilting system is actuated by the controller based on the signal from the horizontal sensor.

6. The cargo balancing system according to claim 5 further comprising a side panel extender operatively coupled to the controller, wherein the side panel extender is actuated by the controller based on the signal from the horizontal sensor.

7. The cargo balancing system according to claim 5 wherein the side panel tilting system comprises a plurality of tilting actuators for tilting the side panels relative to the cargo bed, each tilting actuator mounted between the truck bed and one of the side panels.

8. The cargo balancing system according to claim 6 wherein the side panel extender comprises a plurality of extension members coupled to the side panels and capable of being elevated above the side panels.

9. The cargo balancing system according to claim 5 wherein the horizontal sensor comprises:

a main body;

a guide groove formed in the main body of the horizontal sensor, the guide groove having a center point and curving upward in both directions from the center point;

a roll ball within the guide groove; and contact sensors disposed in the guide groove, wherein the contact sensors are activated by contact with the roll ball.

10. The cargo balancing system according to claim 5 wherein the horizontal sensor is substantially centrally located along a width of the vehicle.

11. The cargo balancing system according to claim 7 wherein each tilting actuator comprises:

a cylinder hingedly mounted at one end to the truck bed, the cylinder having an upper end and a lower end;

an upper field coil and a lower field coil provided in the cylinder;

a plunger provided between the upper and lower field coils, the plunger having an upper surface and a lower surface;

a rod coupled to the upper surface of the plunger, the rod extending out of the cylinder and hingedly mounted to one of the side panels;

an upper elastic member between the upper surface of the plunger and the upper end of the cylinder; and a lower elastic member between the lower surface of the plunger and the lower end of the cylinder.

12. The cargo balancing system according to claim 8, wherein each extension member comprises:

a pair free ends, an upper portion substantially centrally located between the free ends of the extension member, and a pair of catch ridges, each catch ridge between one free end and the upper portion of the extension member.

13. The cargo balancing system according to claim 12 further comprising a plurality of elevating actuators, each elevating actuator comprising:

a cylinder disposed around one of the free ends of the extension member, the cylinder having an upper end;

a plunger coupled to the free end of the extension member around which the cylinder is disposed, the plunger having an upper surface;

a field coil disposed in the upper end of the cylinder an elastic member between the upper surface of the plunger and the upper end of the cylinder.

14. The cargo balancing system according to claim 12 further comprising a locking actuator corresponding to each extension member for maintaining the extension member in an unextended state.

15. The cargo balancing system according to claim 14 wherein the locking actuator comprises:

a cylinder;

a field coil mounted in the cylinder at an end opposite the corresponding extension member;

a plunger slidably mounted in the cylinder;

an elastic member between the plunger and the end of the cylinder opposite the corresponding extension member;

a locking arm coupled to the plunger and extending out of the cylinder to contact one of the catch ridges of the extension member when the locking actuator is in an elongated state.

16. A method of balancing cargo in a bed of a cargo vehicle, the method comprising the steps of:

providing a right and left side panel pivotally mounted to the bed of the vehicle;

sensing a slant of a surface on which the vehicle is traveling;

providing a signal indicative of the slant of the surface to a controller;

tilting the side panels relative to the bed to counter the slant in the surface based on the signal provided to the controller.

17. The method according to claim 16 further comprising the step of increasing an effective height of the side panels.

18. The method according to claim 16 wherein the step of tilting the side panels comprises actuating a plurality of tilting actuators hingedly connected to the bed and one of the side panels.

19. The method according to claim 18 wherein the plurality of tilting actuators comprises a plurality of left tilting actuators corresponding to the left side panel and a plurality of right tilting actuators corresponding to the right side panel, and wherein the step of tilting the side panels further comprises actuating the left tilting actuators and the right tilting actuators in opposite directions.

20. The method according to claim 19 wherein a plurality of extension members are coupled to the side panels, and wherein the step of increasing the effective height of the side panels comprises elevating the extension members above the side panels.

* * * * *